United States Patent
Casanova et al.

(10) Patent No.: US 9,466,429 B1
(45) Date of Patent: Oct. 11, 2016

(54) CONFIGURABLE MULTI-CAPACITOR ASSEMBLY

(71) Applicant: Cornell Dubilier Marketing, Inc., Liberty, SC (US)

(72) Inventors: Hector Arsenio Casanova, Tiverton, RI (US); Rui Miguel Batista, New Bedford, MA (US); Brian L Padelford, New Bedford, MA (US)

(73) Assignee: Cornell Dubilier Marketing, Inc., Liberty, SC (US)

(*) Notice: Subject to any disclaimer, the term of this patent is extended or adjusted under 35 U.S.C. 154(b) by 31 days.

(21) Appl. No.: 14/613,691

(22) Filed: Feb. 4, 2015

Related U.S. Application Data

(60) Provisional application No. 61/936,953, filed on Feb. 7, 2014.

(51) Int. Cl.
| | |
|---|---|
| H01G 11/82 | (2013.01) |
| H01G 5/019 | (2006.01) |
| H01G 4/32 | (2006.01) |
| H01G 4/38 | (2006.01) |
| H01G 4/224 | (2006.01) |
| H01G 4/236 | (2006.01) |
| H01G 5/38 | (2006.01) |
| H01G 9/08 | (2006.01) |

(52) U.S. Cl.
CPC .............. *H01G 5/019* (2013.01); *H01G 4/224* (2013.01); *H01G 4/236* (2013.01); *H01G 4/32* (2013.01); *H01G 4/38* (2013.01); *H01G 5/38* (2013.01); *H01G 9/08* (2013.01); *H01G 11/82* (2013.01)

(58) Field of Classification Search
None
See application file for complete search history.

(56) References Cited

U.S. PATENT DOCUMENTS

| | | | |
|---|---|---|---|
| 3,593,066 A * | 7/1971 | Norman, Sr. | H01G 4/38 361/306.1 |
| 4,408,818 A | 10/1983 | Markarian | |
| 4,558,394 A | 12/1985 | Stockman | |
| 6,212,058 B1 | 4/2001 | Huber | |
| 7,365,959 B1 | 4/2008 | Ward | |
| 7,547,233 B2 * | 6/2009 | Inoue | H01G 2/04 361/328 |
| 7,848,079 B1 | 12/2010 | Gordin et al. | |
| 8,098,479 B1 | 1/2012 | Parler et al. | |
| 8,531,815 B2 | 9/2013 | Stockman | |
| 2014/0126107 A1 * | 5/2014 | Yoda | H01G 4/232 361/303 |

* cited by examiner

*Primary Examiner* — Dion R Ferguson
(74) *Attorney, Agent, or Firm* — Timothy J. Monahan; Monahan & Company, LLC

(57) ABSTRACT

A capacitor assembly is provided with a plurality of wound capacitor elements aligned horizontally in a longitudinally extended housing, whereby the largest capacitor element solely occupies a tier in the housing, another tier in the housing is solely occupied by two of the capacitor elements, and wherein the capacitor elements are configurable to provide various capacitance values.

26 Claims, 7 Drawing Sheets

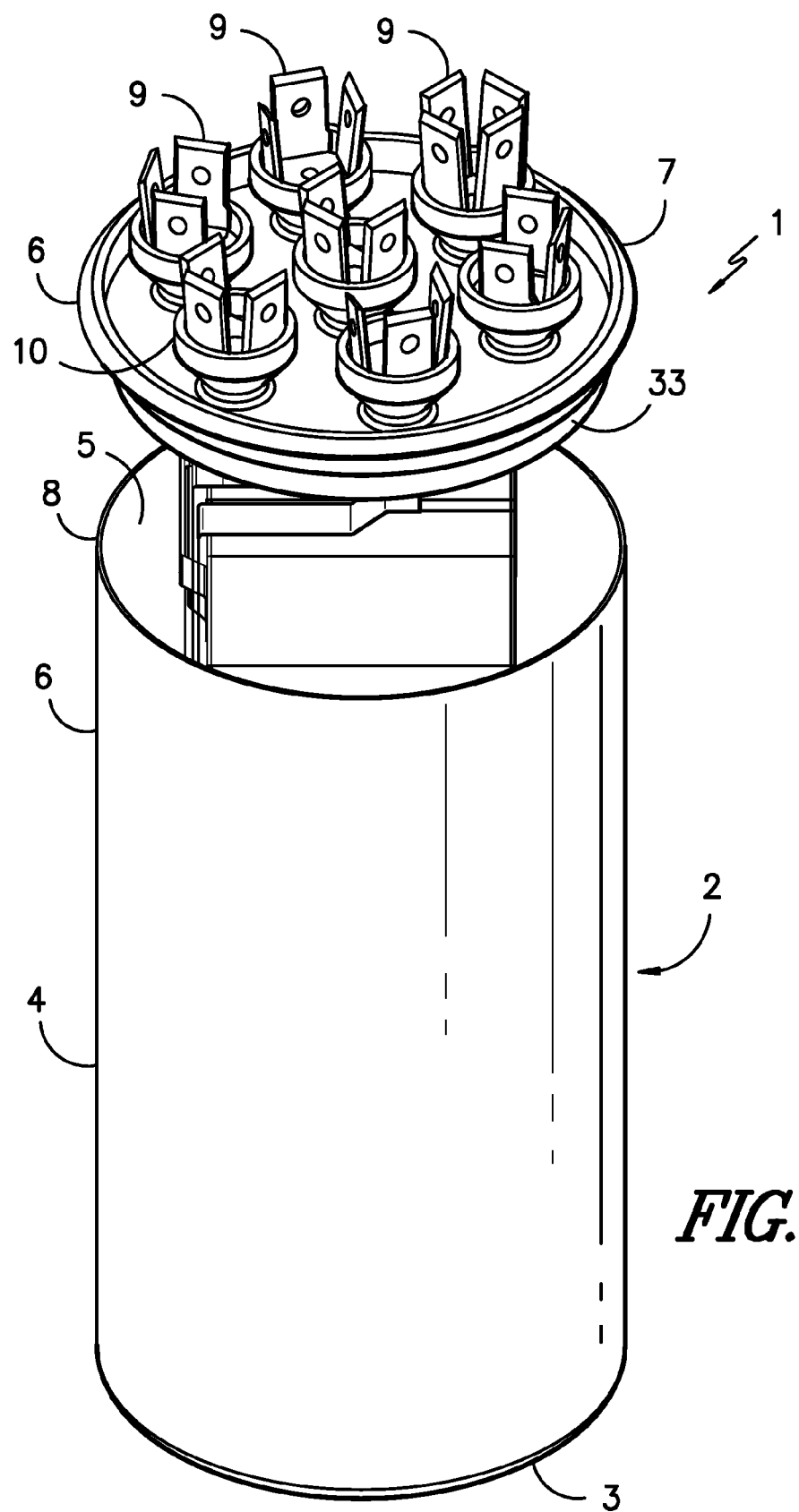
FIG. -1-

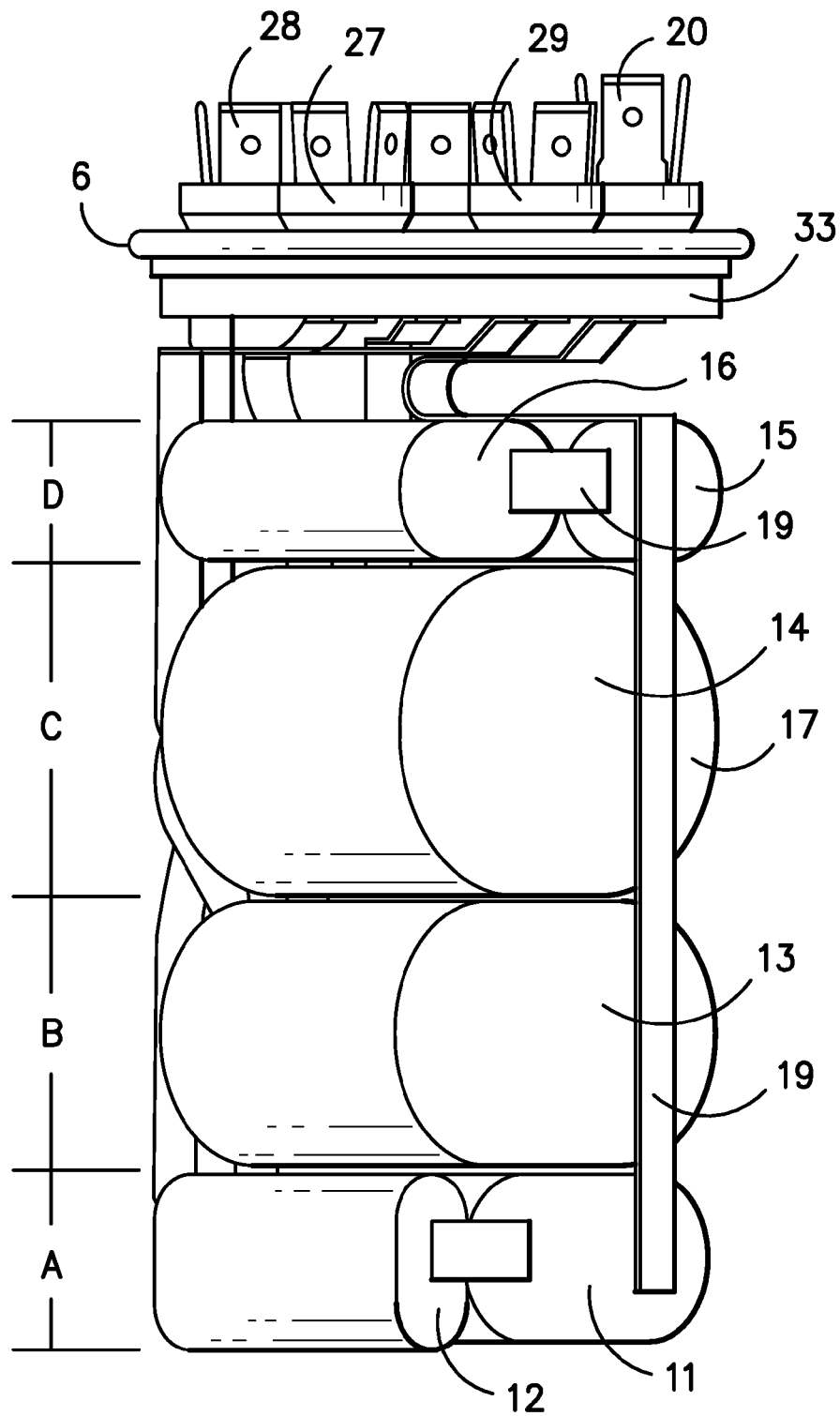
FIG. -2-

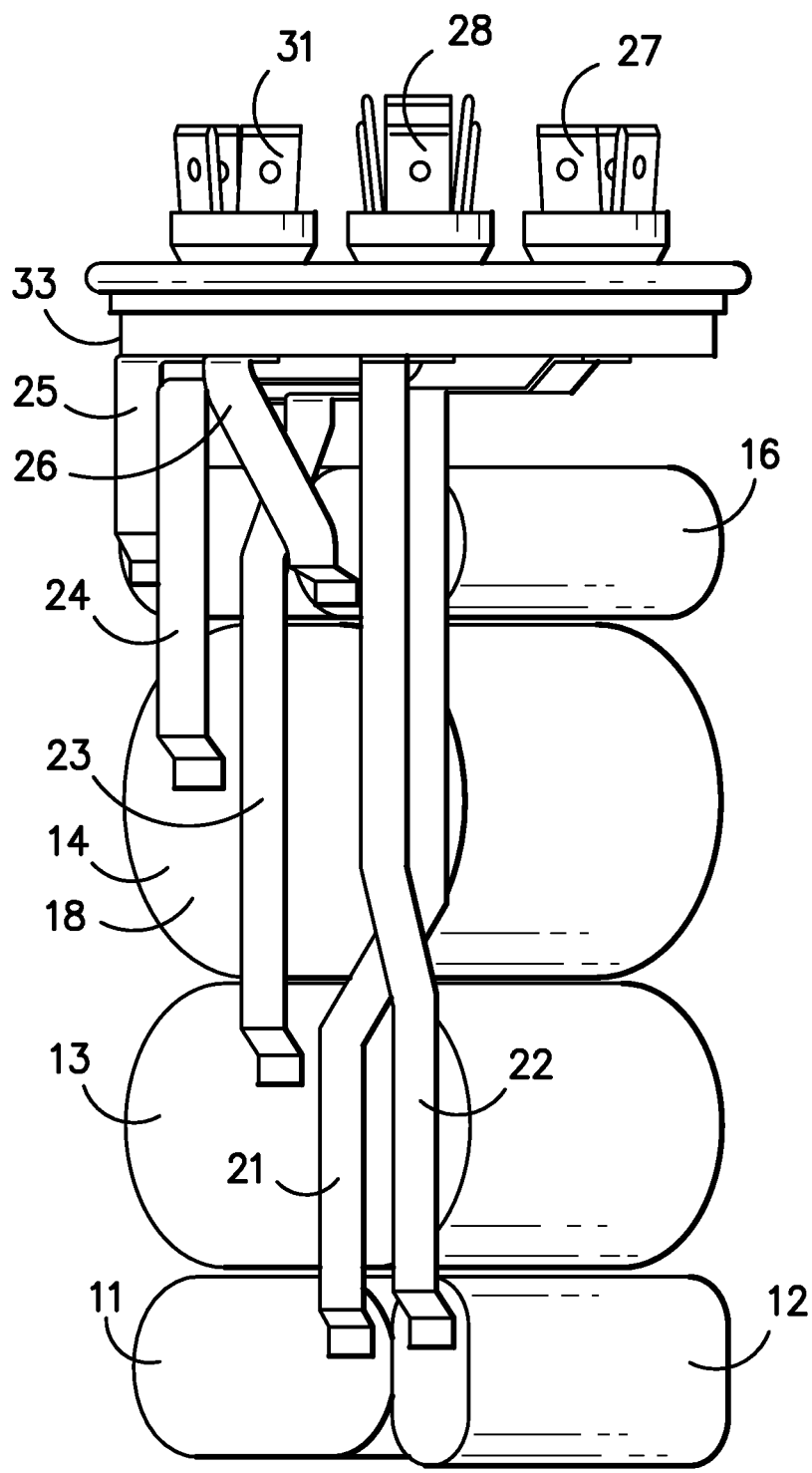
FIG. -3-

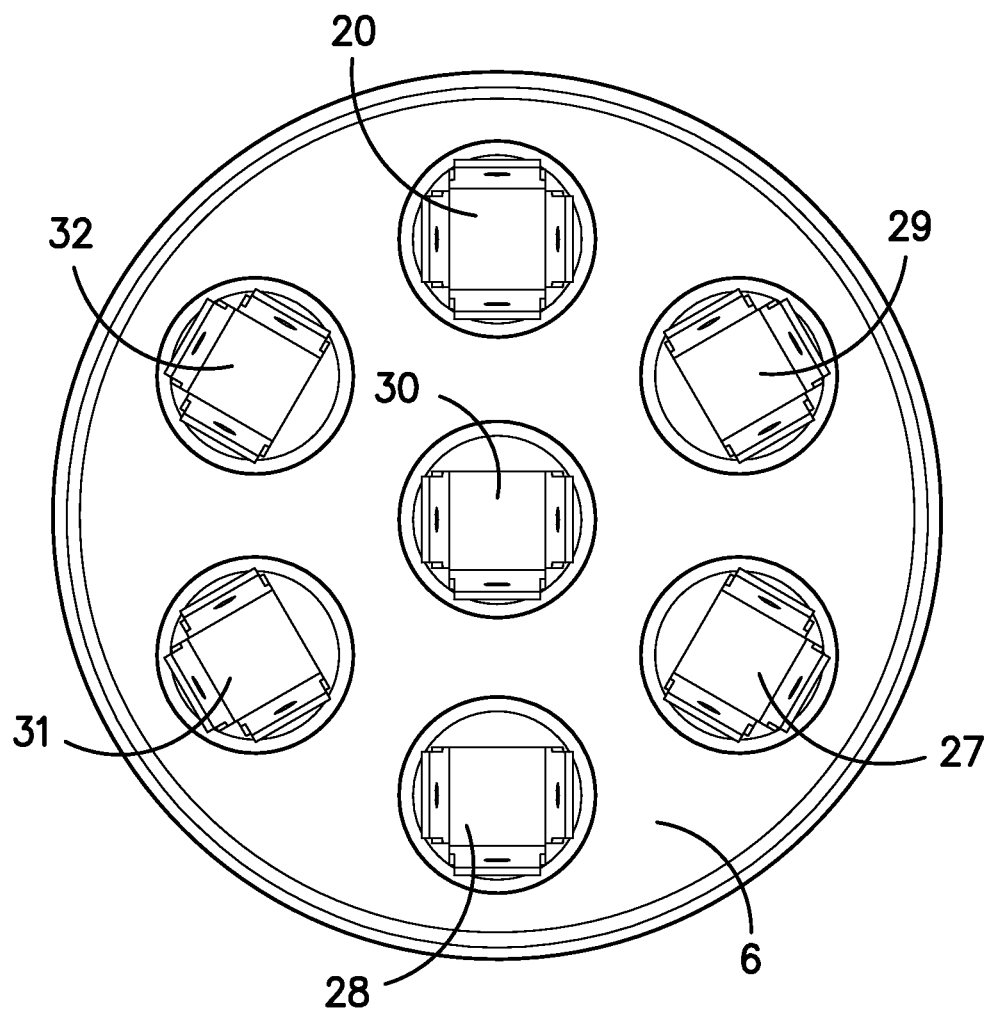
FIG. —4—

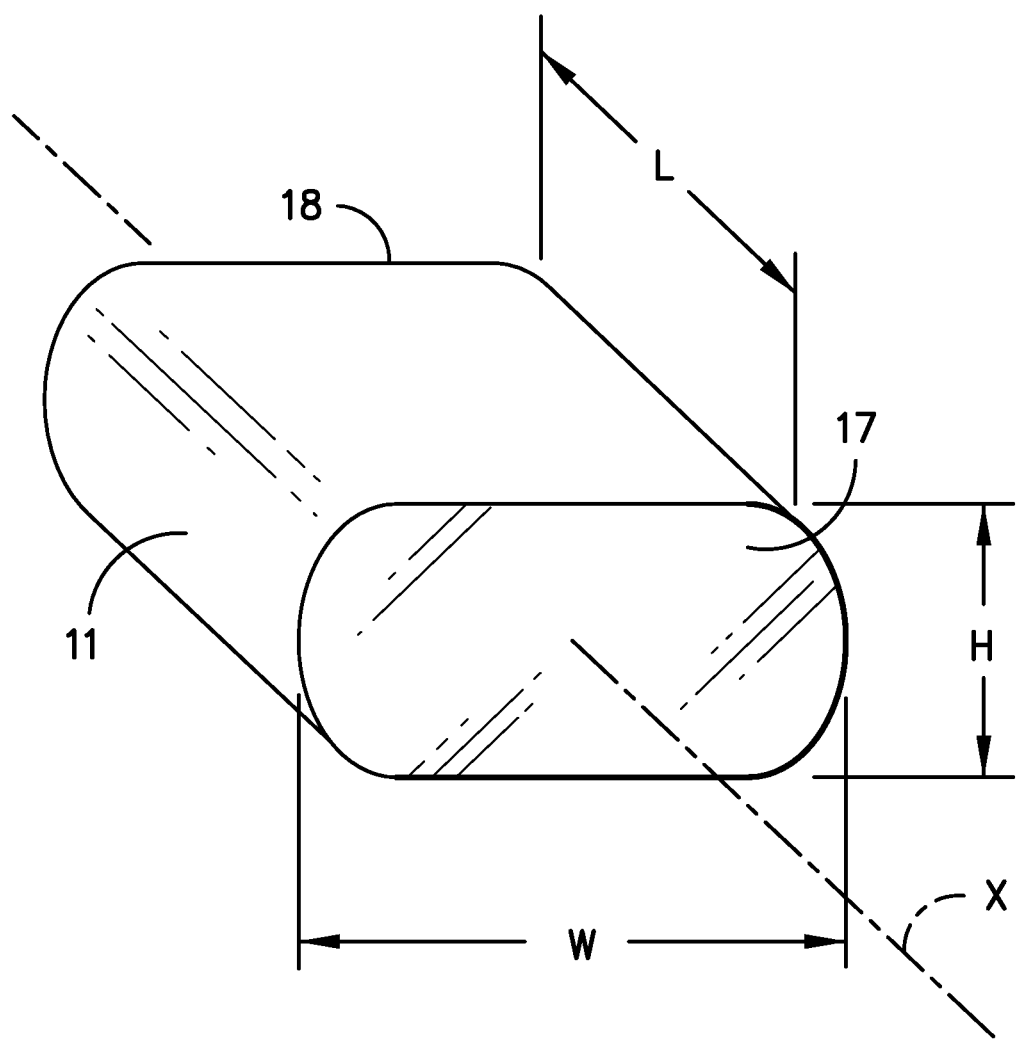
FIG. -5-

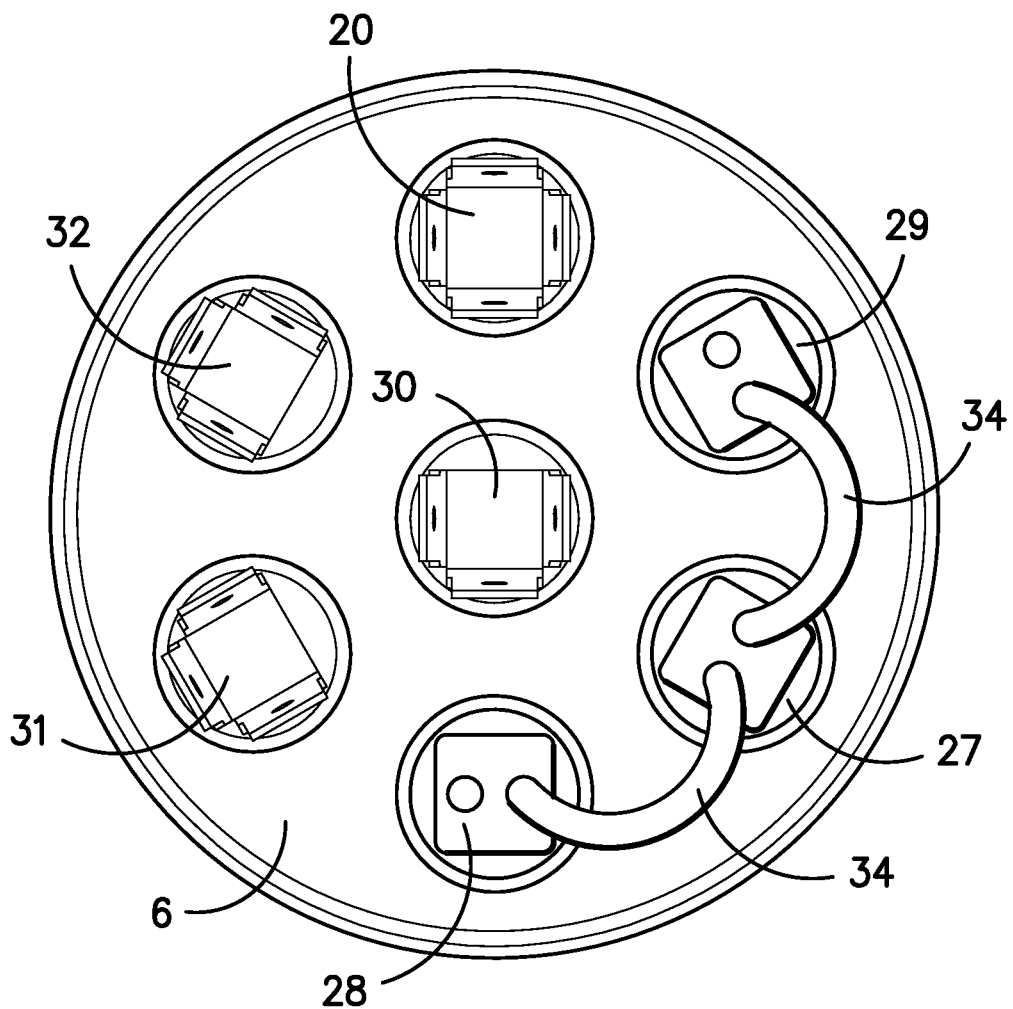
FIG. —6—

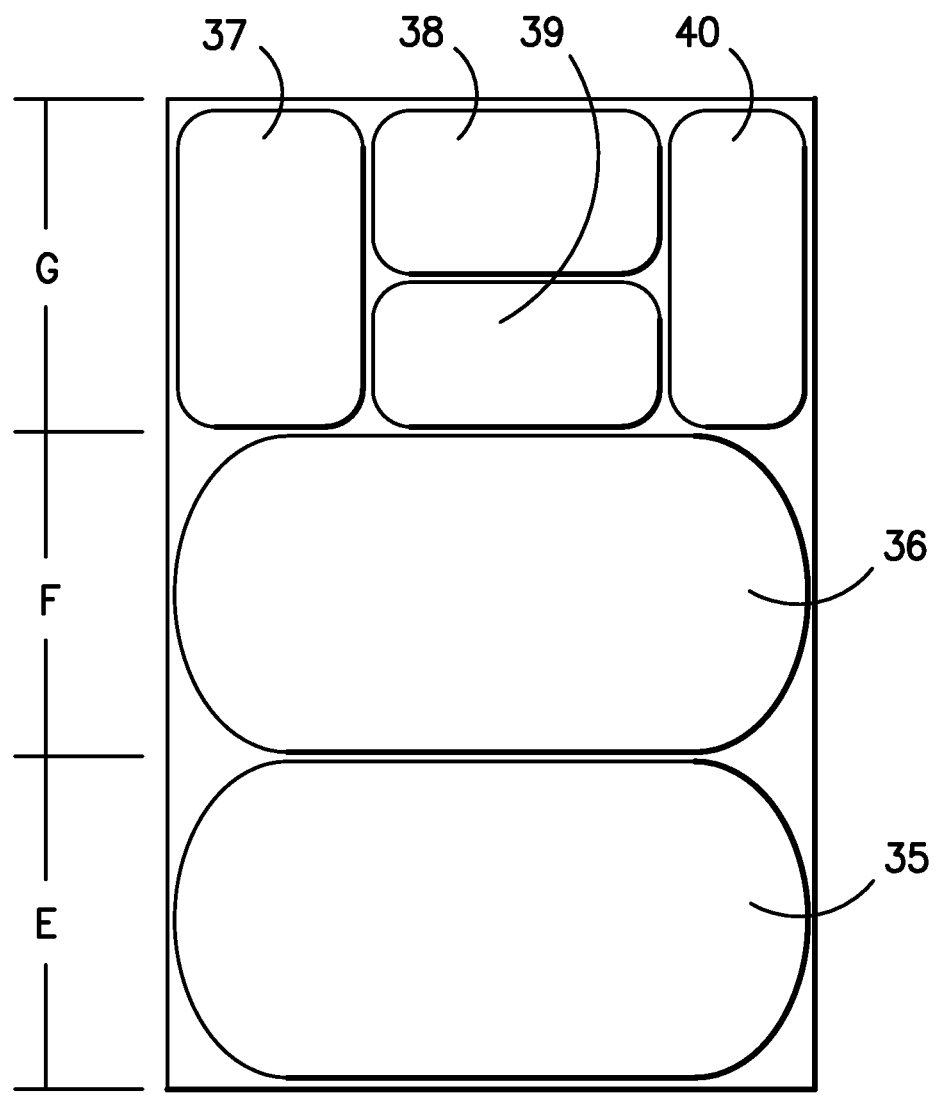
FIG. -7-

CONFIGURABLE MULTI-CAPACITOR ASSEMBLY

This invention relates to an assembly of multiple capacitors arranged in a single housing, whereby the individual capacitors may be configured in various ways to provide a range of capacitance values.

BACKGROUND OF THE INVENTION

The repair and service of electromechanical equipment often entails the replacement of a capacitor having a specific capacitance value. In view of the diversity of brands and product lines, even within a particular industry such as HVAC, it is difficult for a service technician to stock a sufficiently broad range of capacitors to meet all replacement needs. Accordingly, it has been found to be useful to employ a single capacitor assembly that can be configured to provide a variety of capacitance values.

Markarian—U.S. Pat. No. 4,408,818 discloses a multi-sector capacitor, with the terminals on the cover arranged to provide the minimum spacing needed to prevent arcing. Jumper wires are connected to the terminals to obtain the desired capacitance.

Stockman—U.S. Pat. No. 4,558,394 discloses a multi-sector capacitor having an exposed, insulated jumper connecting the sub-capacitors. The jumper may be cut by a repairman to obtain the desired capacitance value.

Ward—U.S. Pat. No. 7,365,959 B1 discloses an assembly having multiple capacitor sectors or elements, which can be configured to achieve the desired capacitance by turning a dial switch mechanism, which is mounted on the cover.

Stockman—U.S. Pat. No. 8,531,815 B2 discloses a capacitor with multiple elements that can be connected to provide a variety of capacitance values by connecting terminals on the cover of the capacitor with jumper wires. A barrier cup assembly with fins extending between adjacent terminals on the cover is provided to prevent arcing. In one embodiment, four wound capacitor elements are oriented vertically and two wound capacitor elements are oriented horizontally in the head room above the vertically oriented capacitors.

Huber—U.S. Pat. No. 6,212,058 B1 and Gordin et al.—U.S. Pat. No. 7,848,079 B1 disclose assemblies having multiple capacitor elements arranged in the housing to improve the volumetric efficiency of the unit. Huber employs three round capacitors arranged in a "star" configuration and placed in a triangular shaped housing. Gordin et al. employ the combination of a relatively large base capacitor, which occupies substantially all of the volume at one end of the housing, and multiple secondary capacitors, which occupy the remaining volume in the housing. The capacitor elements of Gordin et al. are "substantially round in cross-section."

Despite the prior art developments in the field, there remains a need for a configurable, multi-capacitor assembly that is easy to manufacture, employs multiple capacitor elements, achieves improved volumetric efficiency, conforms to the space limitations for replacement capacitors, is readily configurable in the field, and meets all applicable safety requirements and UL test standards.

SUMMARY OF THE INVENTION

A capacitor assembly is provided that meets the foregoing needs and objectives. The capacitor assembly includes a housing having a base and walls extending from the base, which form a receptacle having an opening opposite the base, and a cover overlaying the opening. The interior cavity created in the housing extends longitudinally from the base to the cover.

The capacitor assembly includes first, second and third wound capacitor elements. The capacitor elements may be wound around a core or they may be coreless. The capacitor element is characterized by an axis that is parallel to the core and/or the center about which the sheets forming the capacitor element are wound. The axial direction of the capacitor element is parallel to the direction of the width of the sheets (conductors and insulator) forming the element.

The capacitor elements are arranged in the housing with their axes aligned perpendicular to the longitudinal direction of the interior cavity of the housing. In embodiments of the invention wherein the base and cover forming the housing are at right angles to the walls and interior cavity, the axes of the capacitor elements will be parallel to the base and cover.

The first, second and third capacitor element may advantageously be arranged in at least two tiers within the housing, with each individual tier aligned perpendicular to the longitudinal direction of the interior cavity, and with the tiers aligned in the longitudinal direction, relative to each other. The first and second capacitor elements may positioned in one tier and the third capacitor element may be positioned in another tier.

Each of the capacitor elements has a first end termination and a second end termination. A common terminal is mounted on the outside of the cover of the housing, and the first end terminations of the capacitor elements are electrically connected to the common terminal. Additionally, an individual terminal for each of the capacitor elements is mounted on the outside of the cover and electrically connected to the second end termination of each of the capacitor elements, respectively. In one embodiment of the invention, the center-to-center spacing between the cover terminals is 20.5 mm or greater. The capacitor assembly may be configured to provide various capacitance values by electrically connecting one or more of the individual terminals of the capacitor elements together, in parallel, for example, with jumper wires.

An interrupter plate may be interposed in the electrical connections between the first and second end terminations of the capacitor elements and the terminals mounted on the cover. Relative movement between the cover and the interrupter plate opens one or more of the electrical connections, for example, when pressure builds inside the housing due to an overload or end of life failure.

The invention is not limited to a specific number of capacitor elements within the housing. Accordingly, four, five, six or more wound capacitor elements may be arranged in the housing, with their axes aligned perpendicular to the longitudinal direction of the interior cavity, and separated into three, four or more tiers. By way of example, capacitor elements having a capacitance of from 0.5 to 50 µF may be used in the capacitor assembly of the present invention. In various embodiments of the invention, each of the capacitor elements may have different capacitance values, each of the capacitor elements may have the same capacitance values, or the capacitor assembly may employ a plurality of capacitor elements wherein some of the capacitor elements have the same capacitance value and some of the capacitor elements have different capacitance values.

Improved volumetric efficiency may be enhanced when at least some of the capacitor elements have a "flattened" cross-section, characterized by a width to height aspect ratio of 1.25 or greater, with the width being the greater of the two dimensions. The use of capacitor elements having a flattened cross-section is particularly advantageous when two or more capacitor elements are arranged in the same tier. The capacitor elements may be arranged with their widths aligned parallel to or perpendicular to the longitudinal direction of the interior cavity. Also within the scope of the invention is to provide a combination of one or more of the capacitor elements with their widths aligned parallel to the longitudinal direction of the interior cavity and one or more of the capacitor elements with their widths aligned perpendicular to the longitudinal direction of the interior cavity. The combination of parallel and perpendicular width alignments may occur within the same tier or different tiers, within the housing.

Improved volumetric and capacitor efficiency may be optimized, especially with regard to housings having a circular cross-section or square cross-section, when one or more of the capacitor elements that each solely occupy a tier have a length to width ratio of 2 to 0.75, in particular from 1.75 to 1.

BRIEF DESCRIPTION OF THE DRAWINGS

FIG. 1 is a partially exploded, top perspective view of the capacitor assembly.

FIG. 2 is a side view of the capacitor assembly with the lower portion of the housing removed, showing the common electrical connections to the capacitor elements.

FIG. 3 is a side view of the capacitor assembly with the lower portion of the housing removed, showing the individual electrical connections to the capacitor elements.

FIG. 4 is a top view of the housing cover showing the arrangement of the terminals.

FIG. 5 is a side perspective view of an individual capacitor element identifying the dimensional relationships and its axis of orientation.

FIG. 6 is a top view of the housing cover showing jumper wires electrically connection three of the capacitor elements, in parallel.

FIG. 7 is a schematic diagram depicting a side view of an arrangement of four capacitor elements in a tier.

DETAILED DESCRIPTION OF THE INVENTION

Without intending to limit the scope of the invention, the preferred embodiments and features are hereinafter set forth. All United States patents cited in the specification are incorporated herein by reference.

The term "walls" is intended to include the curved side wall a housing receptacle having a cylindrical or oval cross-section, as well as the planar side walls of housing receptacles having a rectangular or other polygonal cross-section.

The "tiers" are comprised of layers of capacitor elements and may be identified as first, second, third, etc. The identification of the tiers by number or letter, however, is not intended to imply a certain order. The tiers may be arranged in any order along the longitudinal direction of the internal cavity of the housing, unless otherwise indicated.

The terms "sheets" and "films" are used in their general sense to describe materials that are thin in comparison to their length and breadth and are used interchangeably herein.

Referring to FIG. 1, capacitor assembly 1 has housing 2, with base 3 and side walls 4, forming a receptacle having open end 5. Cover 6 overlays open end 5 and is sealed along its perimeter 7 to the upper lip 8 of side walls 4. Cover terminals 9 are mounted on the outside of cover 6. Bushings 10 are provided around each of cover terminals 9 for insulating between the cover terminals 9 and cover 6. The housing may be in the shape of a cylinder, rectangular prism or other three-dimensional geometry, or combinations thereof. For example, the receptacle portion of the housing forming the interior cavity may be a rectangular prism, having a square base and cross-section, with planar sides, which transitions to a circular cover adjacent the open end of the housing.

The housing is made from a material that is substantially impermeable to gases. By way of example, the housing may be made out of metal, in particular, steels including cold-rolled steel, mild steel, stainless steel, and other alloys, copper, tantalum, aluminum, titanium, niobium, nickel, iron, and zinc. If the housing material is susceptible to corrosion, either internally or externally, the material may be coated, plated or provided with other protective treatment, as is known to those skilled in the art. Alternatively, the housing may be made from a synthetic polymeric material, such as thermoplastic resins, thermoplastic elastomers or thermosetting resins.

Referring to FIGS. 2-4, capacitor assembly 1 is shown with the lower portion of housing 2 removed to expose the arrangement of capacitor elements within. Capacitor elements 11-16 are shown arranged in four tiers, identified as A, B, C and D, within the capacitor assembly.

The capacitor elements may be film capacitors. Generally, each such capacitor element comprises first and second conductive sheets, separated by a dielectric, and capable of supporting a direct current or alternating current potential, and thereby storing an electrical charge and energy. The capacitor element may be constructed with metalized polymer films, metal foils and non-metalized film ("plain film") or other non-conductive sheet, and combinations thereof, as appropriate.

In one embodiment of the invention, the capacitor element is constructed from two polymer films, each having a metal applied to the surface of one side of the film, for example, by vapor deposition, with the opposite side of the film remaining uncoated to function as the dielectric. Suitable metals include zinc, aluminum, or an alloy of zinc and aluminum. The polymer film may be a thermoplastic, thermosetting or elastomeric polymer. Specific examples include polyolefins, especially polyethylene, polypropylene and ethylene/propylene copolymers, and polyesters, especially polyethylene terephthalate (PET) and polyethylene naphthalate (PEN). By way of example, the polymer substrate may be 0.3 μm to 30 μm thick, preferably 1.0 μm to 8 μm thick, and the width of the polymer substrate may be from 20 mm to 200 mm.

If a separate dielectric sheet is employed, the sheet may be selected from any insulating material, including polymers, such as polypropylene, polyester, polyethylene, polyamide, polyimide, etc. In one embodiment of the invention, there may be more than two dielectric sheets. For example, a third conductive sheet may be added, whose primary purpose is to provide a metallized surface which connects the first two sheets in series electrically.

The conductive sheets are wound together, with a sheet of a separate dielectric material inserted in between, if necessary. The sheets may be wound around a core, which may be cylindrical, rectangular or other shape selected to create a capacitor element with the desired cross-sectional aspect ratio. The core may be collapsible, allowing the capacitor element to be flattened. Alternatively, the capacitor element may be a coreless winding, which may be selected to create a capacitor element with a more flattened cross-section. By way of example, a capacitor element formed by winding together two conductive sheets, each having a metalized surface with the conductive sheets separated by a dielectric, may comprise from 100 to 10,000 plates, as calculated along a radius perpendicular to the center of the winding.

The capacitor elements are provided with a common edge for each of the conductive sheets, at opposite ends of the capacitor element. By way of example, the common edge may be created by offsetting or staggering the conductive sheets, relative to each other. Alternatively, the common edges at opposite ends of the capacitor element may be created by providing a non-conductive edge at the top of one conductive sheet and a non-conductive edge at the bottom of the other conductive sheet.

A metal coating may be applied to each common edges of the capacitor element, for example, by thermal spraying, thereby providing first and second end termination sites, to electrically connect each end of the capacitor element to a terminal mounted on the cover of the housing. The electrical connections to the termination ends may be tabs, which can be welded to the common edges, for example, to form a metallurgical bond. Suitable capacitor elements and their construction may be found in U.S. Pat. No. 8,098,479 B1.

The present invention is particularly suited to employ capacitor elements that are single capacitors, thereby taking advantage of the reliability, the economies of manufacture and the ability to provide robust electrical connections among the capacitors and between the capacitors and terminals, associated with single capacitors. One or more of the capacitor elements may, however, be a multi-sector capacitor, which are known to those skilled in art and disclosed, for example, in U.S. Pat. No. 8,531,815 B2.

Referring to FIG. 5, the capacitor elements may be characterized by a width "W", a height "H" and a length "L". Furthermore, the capacitor elements can be characterized by an axis "X" that is parallel to the core and/or the center about which the sheets forming the capacitor element are wound. The width is greater than the height, measured at a cross-section taken perpendicular to the axis mid-way along the length of the capacitor element.

Volume efficiency is improved by providing capacitor elements with the width/height aspect ratio of 1.25 or greater. In order to provide a capacitor assembly that can be configured to create a large number of capacitance values, it is generally desirable to employ a plurality of capacitor elements having different capacitances. As the sizes of the capacitor elements decrease, for example, for capacitance values of 0.5 to 17.5 µF, it has been found that improved volume efficiency can be achieved by using capacitor elements with a relatively higher width to height aspect ratio. Accordingly, when capacitor elements are arranged with two or more to a tier within the housing, the aspect ratio of each of such capacitor elements may be 1.5 or greater, or even 1.75 or greater. In one embodiment of the invention, at least 50% of the capacitor elements have an aspect ratio of 1.5 or greater. By way of example, capacitor elements 11-16 have the following width to height aspect ratios, respectively: 2.18; 2.17; 1.64; 1.39; 1.65; and 1.65.

When two or more capacitor elements are arranged in the same tier, it may also be advantageous to align one of the capacitors in the housing with its width parallel to the longitudinal direction of the interior cavity and another capacitor element with its width perpendicular to the longitudinal direction of the interior cavity. Such an arrangement of capacitor elements may be particularly advantageous when the capacitor elements have different capacitance values and the larger capacitor has a value that is at least 50% greater than the capacitance value of the smaller capacitor.

The present invention is particularly useful with housings having a circular or square cross-section taken perpendicular to the longitudinal direction of the interior cavity of the housing. Improved volumetric efficiency may be realized when in combination with such housings, capacitor elements that solely occupy a tier of housing have a length to width ratio of 2 to 0.75, in particular from 1.75 to 1. In one embodiment of the invention, the two largest capacitors each occupy a single tier of the housing. By way of example, capacitor elements 13 and 14 in FIGS. 2 and 3 have a length to width ratio of 1.43 and 1.2, respectively. In one embodiment of the invention, at least 50% of the capacitor elements have a length to width ratio of from 3 to 1.

Referring to FIGS. 2 and 3, six capacitor elements are arranged in four tiers or levels. Tier A is occupied by capacitor elements 11 and 12, with the width of capacitor element 11 aligned horizontally and the width of capacitor element 12 aligned vertically, that is, in the longitudinal direction relative to the internal cavity of housing 2. Tier B is occupied solely by capacitor element 13. Tier C is occupied solely by capacitor element 14, and Tier D is occupied by capacitor elements 15 and 16.

Various embodiments of the invention are characterized by one or more of the following features: (i) at least one of the tiers is solely occupied by a single capacitor element; (ii) the capacitor element having the highest capacitance value solely occupies one of the tiers; (iii) if four or more capacitor elements are provided, the capacitor elements with the two highest capacitance values each solely occupy a tier in the housing; and (iv) at least one of the tiers is occupied by two capacitor elements.

Each of the capacitor elements has a first termination end 17 and a second termination end 18, positioned at opposite ends of the capacitor element. Tab 19 is electrically connected to the first termination end 17 of each of the capacitor elements 11-16 and electrically connected to common terminal 20 mounted adjacent perimeter 7 on the outside of cover 6. Additionally, the second termination end 18 of each of the capacitor elements 11-16 is electrically connected by tabs 21-26 to individual terminals 27-32, respectively, spaced apart on the outside of cover 6. The tabs and terminals may be color coded, that is, assigned distinct, matching colors. The terminals mounted on cover 6 are arranged with center-to-center spacing of 20.5 mm or greater. Despite the spacing requirements, it is nevertheless possible to provide up to six capacitor elements (seven terminals mounted on cover 6) in an area of 7 in$^2$ or less, 6 in$^2$ or less or even 5 in$^2$ or less.

While the invention is illustrated with tabs providing the electrical connections between capacitor elements, the capacitor elements and the interrupter plate and between the interrupter plate and the terminals on the cover of the housing, it can be understood that the electrical connection may be provided by tabs, wires or their equivalents.

In one embodiment of the invention, the capacitor elements are arranged in the housing with their first end terminations facing substantially the same direction, as shown in FIG. 2. Such an arrangement provides manufacturing advantages—the common electrical connection(s) linking the capacitor elements together, for example tab 19, can be attached to all of the common end terminations, without having to reposition the assembly, and the length of the tab or other electrical connection joining the common end terminations is minimized.

Interrupter plate 33 is interposed in the electrical connections between the first and second end terminations of the capacitor elements and the terminals mounted on the cover. A segment of each of tabs 19 and 21-26 has an end affixed to interrupter plate 33 and an end affixed to a cover terminal. Relative movement between cover 6 and interrupter plate 33 opens one or more of the electrical connections, for example, when pressure builds inside the housing due to an overload or end of life failure. The structure and arrangement of pressure interrupter plates in multi-capacitor assemblies is known in the art and are disclosed in the various references cited herein.

By way of example, capacitor elements 11-16 have the following values, respectively: 10 µF; 2.5 µF; 20 µF; 25 µF; 5 µF and 5 µF. The individual capacitor elements may be combined to create capacitance values ranging from 2.5 µF to 67.5 µF, and a total of 109 different values, or any one of the capacitor elements may be selected to provide the desired capacitance. Accordingly, in a capacitor assembly having four or more capacitor elements, it is preferable to provide at least four different capacitance values, with the difference in values being 1 µF or greater, preferably 2 µF or greater.

Referring to FIG. 6, jumper cables 34 are shown connecting three of the individual terminals on cover 6, namely 27, 28, and 29. The three capacitors can be connected in parallel, for example to an AC motor, by an electrical connection from the motor to terminal 20 and an electrical connection from the motor to one of terminals 27-29.

It can be understood that while the multi-capacitor assembly is illustrated with all of the capacitor elements arranged in tiers, it is possible to provide an arrangement whereby the capacitor elements are aligned in the housing with their axes perpendicular to the longitudinal direction of the interior cavity, with the largest capacitor solely occupying a tier, or even the two largest capacitors each solely occupying a tier, with three, four or more of the other capacitor elements together occupying a single tier. Referring to FIG. 7, the two largest capacitor elements 35 and 36 solely occupy Tier E and Tier F, respectively, and capacitor elements 37-40 together occupy Tier G. Also, within the scope of the present invention is to provide a multi-capacitor assembly wherein the capacitor elements are aligned in the housing with their axes perpendicular to the longitudinal direction of the interior cavity, with the largest capacitor having a sufficiently high width to height aspect ratio that it may be aligned with its width parallel to the longitudinal direction of the interior cavity, with one or more other capacitor elements in the same tier as the largest capacitor.

There are, of course, many alternative embodiments and modifications, which are intended to be included within the following claims.

What we claim is:

1. A capacitor assembly, comprising:
   (a) a housing having a base, walls extending from the base to define a longitudinally extending interior cavity, an opening opposite the base, and a cover overlaying the opening;
   (b) first, second and third wound capacitor elements, each of the capacitor elements having an axis, a first end termination and a second end termination, and the capacitor elements are arranged in the housing with the axes of the capacitor elements aligned perpendicular to the longitudinal direction of the interior cavity, and further provided that the first and second capacitor elements occupy a first tier within the housing and the third capacitor element occupies a second tier within the housing; and
   (c) a common terminal mounted on the outside of the cover and electrically connected to the first end terminations of each of the capacitor elements; and
   (d) first, second and third terminals mounted on the outside of the cover and electrically connected to the second end termination of the first, second and third capacitor elements, respectively.

2. The capacitor assembly of claim 1, further comprising an interrupter plate positioned in the housing between the cover and the capacitor elements, whereby the interrupter plate is interposed in the electrical connections between the capacitor elements and the terminals, whereby relative movement between the cover and the interrupter plate opens the electrical connections between the capacitor element and the terminals.

3. The capacitor assembly of claim 1, wherein the first and second capacitor elements solely occupy the first tier within the housing.

4. The capacitor assembly of claim 3, wherein the third capacitor element solely occupies the second tier within the housing.

5. The capacitor assembly of claim 1, wherein the first, second and third capacitor elements each have a capacitance of from 0.5 to 50 µF.

6. The capacitor assembly of claim 1, wherein the first and second capacitor elements have a width to height aspect ratio of 1.5 or greater.

7. The capacitor assembly of claim 6, wherein the first capacitor element is arranged in the housing with its width aligned parallel to the longitudinal direction of the interior cavity, and the second capacitor element is arranged in the housing with its width aligned perpendicular to the longitudinal direction of the interior cavity.

8. The capacitor assembly of claim 6, wherein the third capacitor has a width to height aspect ratio of 1.25 or greater.

9. The capacitor assembly of claim 1, wherein the common terminal is positioned on the perimeter of the cover.

10. The capacitor assembly of claim 1, further comprising (i) a fourth wound capacitor element having an axis, a first end termination and a second end termination, and the fourth capacitor element is arranged in the housing with the axis of the capacitor element aligned perpendicular to the longitudinal direction of the interior cavity, whereby the fourth capacitor element occupies a third tier within the housing, (ii) an electrical connection between the common terminal and the first end termination of the fourth capacitor element; and (iii) a fourth terminal mounted on the outside of the cover and electrically connected to the second end termination of the fourth capacitor element.

11. The capacitor assembly of claim 10, wherein the fourth capacitor element solely occupies the third tier within the housing.

12. The capacitor assembly of claim 11, further comprising (i) fifth and sixth wound capacitor elements, each of the fifth and sixth capacitor elements having an axis, a first end termination and a second end termination, and the fifth and sixth capacitor elements are arranged in the housing with the axes of the capacitor elements aligned perpendicular to the longitudinal direction of the interior cavity, whereby the fifth and sixth capacitor elements occupy a fourth tier within the housing, (ii) an electrical connection between the common terminal and the first end terminations of the fifth and sixth capacitor elements; and (iii) fifth and sixth terminals mounted on the outside of the cover and electrically connected to the second end termination of the fifth and sixth capacitor elements, respectively.

13. The capacitor assembly of claim 12, wherein the fourth capacitor element solely occupies the third tier within the housing, and the fifth and sixth capacitor elements solely occupy the fourth tier of the housing element.

14. The capacitor assembly of claim 12, wherein the first, second, third, fourth, fifth and sixth capacitor elements each have a capacitance of from 0.5 to 50 µF.

15. The capacitor assembly of claim 1, wherein at least 50% of the capacitor elements have a width to height aspect ratio of 1.5 or greater.

16. A capacitor assembly, comprising:
   (a) a housing having a base, walls extending from the base to define a longitudinally extending interior cavity, an opening opposite the base, and a cover overlaying the opening;
   (b) first, second and third wound capacitor elements, each of the capacitor elements having an axis, a first end termination and a second end termination, and the capacitor elements are arranged in the housing with the axes of the capacitor elements aligned perpendicular to the longitudinal direction of the interior cavity, wherein a capacitance value of the third capacitor element is greater than a capacitance value of each of the first and second capacitor elements; and
   (c) a common terminal mounted on the outside of the cover and electrically connected to the first end terminations of each of the capacitor elements; and
   (d) first, second and third terminals mounted on the outside of the cover and electrically connected to the second end termination of the first, second and third capacitor elements, respectively.

17. The capacitor assembly of claim 16, wherein the third capacitor solely occupies a first tier within the housing.

18. The capacitor assembly of claim 17, wherein the first and second capacitor elements solely occupy a second tier within the housing.

19. The capacitor assembly of claim 16, further comprising (i) a fourth wound capacitor element having an axis, a first end termination and a second end termination, and the fourth capacitor element is arranged in the housing with the axis of the capacitor element aligned perpendicular to the longitudinal direction of the interior cavity, (ii) an electrical connection between the common terminal and the first end termination of the fourth capacitor element; and (iii) a fourth terminal mounted on the outside of the cover and electrically connected to the second end termination of the fourth capacitor element.

20. The capacitor assembly of claim 19, wherein the capacitor elements have at least four different capacitance values, with a difference of 2 µF or greater.

21. The capacitor assembly of claim 20, wherein the capacitor elements with the two highest capacitance values each solely occupy a tier in the housing.

22. The capacitor assembly of claim 19, further comprising (i) fifth and sixth wound capacitor elements, each of the fifth and sixth capacitor elements having an axis, a first end termination and a second end termination, and the fifth and sixth capacitor elements are arranged in the housing with the axes of the capacitor elements aligned perpendicular to the longitudinal direction of the interior cavity, (ii) an electrical connection between the common terminal and the first end terminations of the fifth and sixth capacitor elements; and (iii) fifth and sixth terminals mounted on the outside of the cover and electrically connected to the second end termination of the fifth and sixth capacitor elements, respectively.

23. The capacitor assembly of claim 22, wherein at least two of the capacitor elements have a capacitance value of from 0.5 to 17.5 µF, and the at least two capacitor elements solely occupy a tier in the housing.

24. The capacitor assembly of claim 22, wherein the first, second, third, fourth, fifth and sixth capacitor elements each have a capacitance value of from 0.5 to 50 µF.

25. The capacitor assembly of claim 16, wherein the third capacitor element has a length to width ratio of from 2 to 0.75.

26. The capacitor assembly of claim 22, wherein the capacitor elements with the two highest capacitance values each have a length to width ratio of from 1.75 to 1.

\* \* \* \* \*